UNITED STATES PATENT OFFICE.

CARL IMMERHEISER, OF LUDWIGSHAFEN-ON-THE-RHINE, GERMANY, ASSIGNOR TO THE BADISCHE ANILIN & SODA FABRIK, OF LUDWIGSHAFEN-ON-THE-RHINE, GERMANY, A CORPORATION OF BADEN.

AZO-DYE LAKE AND PROCESS OF MAKING SAME.

No. 799,058. Specification of Letters Patent. Patented Sept. 12, 1905.

Application filed April 29, 1904. Serial No. 205,584.

*To all whom it may concern:*

Be it known that I, CARL IMMERHEISER, doctor of philosophy and chemist, a subject of the King of Bavaria, residing at Ludwigshafen-on-the-Rhine, in the Kingdom of Bavaria, German Empire, have invented new and useful Improvements in Azo-Dye Lakes and Processes of Making the Same, of which the following is a specification.

I have discovered that exceedingly valuable coloring-matter lakes can be prepared from such insoluble azo coloring-matters as shortly after their preparation have a soft, oily, or a resinous consistence or which at a temperature of about 100° centigrade are soft or liquid—that is to say, the coloring-matters must be readily fusible without decomposition.

As examples of azo coloring-matters which are suitable for the purposes of my invention I mention those prepared from crude xylidin and beta-naphthol, and more especially those prepared from return xylidin—that is, the product resulting when crude xylidin has been freed as far as conveniently possible from meta xylidin and para xylidin, as is done in the manufacture of these bodies, and beta-naphthol, also crude or return, xylidin azo-cresol or azo-phenol, or ortho-toluidin azo-phenol or azo-para-cresol, and the like.

To prepare the new lakes, a coloring-matter of the character aforesaid—such, for instance, as that prepared from crude xylidin and beta-naphthol (which at ordinary temperature when freshly prepared is a pasty, oily, or resinous mass) is warmed and intimately mixed with dry and finely-ground heavy spar, kaolin, alumina, or any other substratum usually employed or capable of use for the preparation of lakes, or the substratum can be made into a paste and be intimately stirred with the melted coloring-matter. The paste so obtained can be directly employed, or it can be dried at ordinary or a higher temperature. The ultimate shade is not fully developed until the lake is dry.

I have further discovered that a suitable compound which will conduce to the liquefaction of the azo coloring-matters above mentioned can be used to favorably influence the formation of the coloring-matter lake. As bodies suitable for this purpose I may mention the following, namely: alkali salts of higher fatty acids, phenols, acetin, glycerin, anilin, and the like. I have also discovered that with the aid of these liquefying agents various azo coloring-matters which do not of themselves melt at a temperature of about 100° centigrade can be caused to melt at or under a temperature of 100° centigrade and can then be used for the formation of lakes, as hereinbefore explained. As an instance of such coloring-matters I mention anilin-azo-phenol and crude toluidin-azo-beta-naphthol; but others can be employed. Further, to the easily-melting azo coloring-matters before mentioned other azo coloring-matters—for example, anilin-azo-beta-naphthol, or the like—or other organic coloring-matters of a different nature, such as rosindon and the like, can be added, even though they be solid and melt at comparatively high temperatures. Suitable mixtures of this kind also possess the property of being easily liquefied and can consequently be directly employed, as described above, for the formation of lakes, or the coloring-matter, for example, directly obtained from crude toluidin and para-cresol can be employed, although the azo coloring-matter obtained from para-toluidin and para-cresol only melts at a comparatively high temperature. In place of the aforementioned substrata, or in addition thereto, colored bodies, such as minium or vermilion, can be employed or such artificial coloring-matter lakes as have been produced by the above-mentioned substrata and lake-forming coloring-matters, such as ponceau, lithol red, and the like, with or without the aid of a precipitating agent.

The following examples will serve to further illustrate the nature of my invention, which, however, is not confined to these examples. The parts are by weight.

Example 1: Intimately mix together at ordinary temperature or while gently warming, one (1) part of the coloring-matter prepared from diazotized return xylidin and para-cresol and fifty (50) parts of finely-ground heavy spar. A lake of intensely yellow color and great fastness results.

Example 2: Melt on the water-bath one (1) part of the coloring-matter prepared from diazotized return xylidin and beta-naphthol. To this coloring-matter add a paste prepared from fifty (50) parts of finely-ground heavy spar and ten (10) parts of water. Carefully stir in the components together until a uniform distribution thereof is attained. The result, which is at first but slightly colored, becomes when dry brilliant red. The drying can be effected at ordinary temperature or by warming. The lake so obtained is insoluble in water and exceedingly fast against the action of alkalies and light.

Example 3: Mix together seven (7) parts of the coloring-matter of the preceding Example 2 with three (3) parts of rosindon. Heat the whole on the water-bath until liquefied. Then uniformly mix it with a paste prepared from five hundred (500) parts of finely-ground heavy spar and one hundred (100) parts of water. When dry an intensely-colored yellow-red lake of great fastness is obtained.

Example 4: Mix together five hundred (500) parts of finely-ground heavy spar, thirty-seven (37) parts of lithol red containing twenty-five (25) per cent. of the pure dye, and ten (10) parts of crystallized barium chlorid, and boil the whole with from one hundred to one hundred and fifty (100-150) parts of water. Uniformly mix this with two and a half (2.5) parts of the coloring-matter of the previous Example 2, which has previously been liquefied by heating on the water-bath. The paste so obtained can either be directly used or it can be dried at ordinary temperature or by gently heating. The lake so obtained is intensely red and very fast.

Example 5: Mix one (1) part of the coloring-matter obtained from crude xylidin and beta-naphthol with one (1) part of sodium ricinoleate, (containing fifty (50) per cent. of the pure salt.) Bring this mixture to the liquid form and intimately mix it with fifty (50) parts of finely-ground heavy spar. A lake is at once obtained of a very intense and fiery red.

In place of the above coloring-matter an equal weight of the coloring-matter obtained from, for instance, crude diazotized toluidin and phenol can be employed. The result is a yellow coloring-matter lake.

Example 6: Mix together two (2) parts of the coloring-matter anilin-azo-phenol and three (3) parts of sodium ricinoleate and melt the mixture by heating it by means of steam. Stir the dark-yellow mass with a paste composed of fifty (50) parts of finely-ground heavy spar and ten (10) parts of water and intimately mix the whole. When dry a yellow lake results.

Example 7: Heat on the boiling water-bath until liquid a mixture of two (2) parts of the coloring-matter crude toluidin-azo-beta-naphthol and one and a half (1.5) parts of anilin and intimately mix the result with a paste prepared from fifty (50) parts of finely-ground heavy spar and ten (10) parts of water. When dry the lake so obtained is red.

Now what I claim is—

1. The process for the production of coloring-matter lakes, which consists in melting an easily-fusible azo coloring-matter with a substratum in the presence of a compound which will conduce to the fusion of the azo coloring-matter employed.

2. As a new composition of matter, a coloring-matter lake consisting of an easily-fusible azo coloring-matter intimately commingled with a substratum.

3. As a new composition of matter, a coloring-matter lake consisting of an easily-fusible azo coloring-matter and a compound which will conduce to the fusion of the azo coloring-matter employed, intimately commingled with a substratum.

4. As a new composition of matter, a coloring-matter lake consisting of the azo coloring-matter obtainable from return xylidin and beta-naphthol intimately commingled with a substratum.

5. As a new composition of matter, a coloring-matter lake consisting of the azo coloring-matter obtainable from return xylidin and beta-naphthol intimately commingled with heavy spar.

In testimony whereof I have hereunto set my hand in the presence of two subscribing witnesses.

CARL IMMERHEISER.

Witnesses:
ERNEST G. EHRHARDT,
J. ALEC. LLOYD.